(12) United States Patent
Chen et al.

(10) Patent No.: US 9,681,043 B2
(45) Date of Patent: Jun. 13, 2017

(54) MULTI-CAMERA IMAGING SYSTEM, AND COMPENSATION METHOD FOR IMAGE RECONSTRUCTION

(71) Applicants: LITE-ON ELECTRONICS (GUANGZHOU) LIMITED, Guangzhou (CN); LITE-ON TECHNOLOGY CORPORATION, Taipei (TW)

(72) Inventors: Jau-Yu Chen, Taipei (TW); Chih-Hsiung Huang, New Taipei (TW)

(73) Assignees: LITE-ON ELECTRONICS (GUANGZHOU) LIMITED, Guangzhou (CN); LITE-ON TECHNOLOGY CORPORATION, Taipei (TW)

( * ) Notice: Subject to any disclaimer, the term of this patent is extended or adjusted under 35 U.S.C. 154(b) by 77 days.

(21) Appl. No.: 14/692,716

(22) Filed: Apr. 21, 2015

(65) Prior Publication Data

US 2016/0037023 A1 Feb. 4, 2016

(30) Foreign Application Priority Data

Jul. 30, 2014 (CN) .......................... 2014 1 0370781

(51) Int. Cl.
*G02B 13/16* (2006.01)
*H04N 5/225* (2006.01)
(Continued)

(52) U.S. Cl.
CPC ..... *H04N 5/23229* (2013.01); *G02B 27/0075* (2013.01); *H04N 5/2254* (2013.01); *H04N 5/2258* (2013.01)

(58) Field of Classification Search
CPC .. H04N 5/217; H04N 5/2254; H04N 5/23229; H04N 5/2258; G03B 13/36
(Continued)

(56) References Cited

U.S. PATENT DOCUMENTS

| 9,134,587 B2 * | 9/2015 | Lim | ................... H02K 41/0356 |
| 2010/0259648 A1 * | 10/2010 | Iijima | .................... G01C 3/085 |
| | | | 348/241 |

(Continued)

FOREIGN PATENT DOCUMENTS

| TW | 200848779 A | 12/2008 |
| TW | 201409150 A | 3/2014 |
| WO | WO2013/055960 A1 | 4/2013 |

*Primary Examiner* — Yogesh Aggarwal
(74) *Attorney, Agent, or Firm* — Li & Cai Intellectual Property (USA) Office

(57) ABSTRACT

The disclosure relates to a multi-camera imaging system, and a compensation method for image reconstruction. The main components of the multi-camera imaging system are an image capturing module having a multi-lens module and a multi-sensor module, and a distance adjustment unit automatically adjusting the distance between the multi-lens and multi-sensor modules. Note that the distance adjustment unit conducts compensation performed on the change of the system's focal length caused by temperature in the system. The multi-camera imaging system further includes a position-sensing module which is used to sense a displacement or change of the distance made by the distance adjustment unit. A set of image reconstruction parameters corresponding to the displacement or the change of distance is then provided.

9 Claims, 6 Drawing Sheets

(51) Int. Cl.
*H04N 5/232* (2006.01)
*G02B 27/00* (2006.01)

(58) Field of Classification Search
USPC .............. 348/335, 340, 345, 348, 350, 352
See application file for complete search history.

(56) References Cited

U.S. PATENT DOCUMENTS

| | | | | |
|---|---|---|---|---|
| 2014/0085505 | A1* | 3/2014 | Asuka | H04N 5/2176 |
| | | | | 348/229.1 |
| 2014/0091204 | A1* | 4/2014 | Ezawa | G02B 7/08 |
| | | | | 250/208.1 |
| 2015/0070536 | A1* | 3/2015 | Sasaki | H04N 5/367 |
| | | | | 348/246 |

* cited by examiner

MULTI-CAMERA IMAGING SYSTEM, AND COMPENSATION METHOD FOR IMAGE RECONSTRUCTION

BACKGROUND OF THE INVENTION

1. Field of the Invention

The present invention generally relates to a multi-camera imaging system, and a compensation method for image reconstruction; more particularly, to a system and method for generating image reconstruction parameters for a multi-camera imaging system when a displacement of any change of distance between the multi-lens module and the multi-sensor module is found.

2. Description of Related Art

Reference is made to FIG. 1 which schematically shows a conventional matrix-array camera. The matrix-array camera includes multiple cameras. Every camera includes a set of lenses and a corresponding image sensor. Thus the matrix-array camera includes a multi-lens module and a multi-sensor module. For example, the shown lens array 101 is an essential component of the matrix-array camera. Multiple arrayed image sensors (not shown in this diagram) are correspondingly disposed below the lens array 101. The matrix-array camera also requires an outer carrier mechanism 10.

A specific space exists between the adjacent lenses of the lens array (101) within the multi-lens module shown in the diagram. The space between the lenses causes a parallax when the camera captures images from the multiple lenses by shooting the same scene where an object is located. Therefore, the matrix-array camera incorporates a software or hardware utility to reconstruct the plurality of images for gaining a merged picture. The image reconstruction process requires reconstruction parameters to calibrate the plurality of imaging positions and imaging ranges, in order to obtain a correct merged picture of excellent quality. In addition, the matrix-array camera may have smaller volume.

Regarding the focusing system of the camera, a focus for gaining a clear image makes a space between the lens and an image sensor. Referring to an optical imaging equation ($1/u+1/v=1/f$), the variable u indicates an object distance (u) between the lens and the scene; the variable v indicates an image distance (v) between the lens and the imaging position. The equation shows that the reciprocal value of the focal length (f) equals the reciprocal value of the object distance added to the reciprocal value of the image distance. In general, the object distance is a large value as compared to the image distance. The image distance approaches the focal length according to the imaging equation.

The camera with correct focusing condition can acquire a clear image. The clear image can be obtained when the camera has a proper image distance. However, the focal length for the lens may be improperly changed due to external factors. For example, the change of temperature may vary the lens due to effect of thermal expansion. Further, the change of temperature may vary the refractive index of the lens. The variations in the lens therefore may make changes in the focal length of the camera, and cause error imaging. To solve the error, a temperature compensation mechanism is applied in the conventional technology. The temperature compensation mechanism is employed to compensate the change of the focal length due to the effect of temperature. Therefore the relationship between the focal length and the image distance may lead to calibrating image distance and allow clear imaging onto the image sensor through the lens.

The temperature compensation mechanism may be implemented by incorporating an object in which its shape can be changed with the change of temperature. When the camera is disposed with this mechanical design utilizing the object, the change of focal length of the assembly of lens and image sensor due to the temperature variation can be well compensated for.

The mentioned object is characterized in that its shape can be changed with the change of temperature. For example, the temperature rise may change the outer curve of the object; and the curve is in opposite direction when the temperature drops. Through this mechanism, the distance between the lens and the image sensor can be calibrated.

In an example, the object implementing the temperature compensation mechanism may be made of composite materials which are assemblies of at least two materials. The two materials have different characteristics reacting to the effect of thermal expansion with change of temperature. When the curve of composite materials is in a specific direction due to the change of temperature, the variation of focal length is compensated for.

According to the temperature compensation mechanism applied to the conventional lens module, one of the solutions is to introduce a compensation flake disposed between the lens and the lens holder. The bendable compensation flake may bring the lens to move along the direction of optical axis. The movement keeps the imaging plane of the lens module over a preset plane surface.

SUMMARY OF THE INVENTION

Any change of focal length of a camera system may result in altering imaging position of an object upon an image sensor. It may cause a serious problem to reconstruct the image when the altering of imaging position is made to the image capturing module of a matrix-array camera. To provide a solution to correctly reconstruct the image especially for the matrix-array camera, the disclosure provides a compensation method for image reconstruction for a multi-camera imaging system. The imaging system renders the image reconstruction parameters in accordance with displacement of a lens module of the system, or change of distance between the lens module and its corresponding image sensor.

The major cause of altering the focal length for the matrix-array camera is the refractive index of the lens is changed due to temperature change, or the effect of thermal expansion made to the lens. Some conventional technologies have been developed to compensate for failure of focusing as the change of focal length based on temperature change. The conventional compensation mechanism is to modify the position of the lens module. However, the displacement of the lens module due to the compensation may also result in changing the distance between the multi-sensor module and the multi-lens module of the matrix-array camera. This distance is relevant to an image distance of the lens.

Further, the imaging position or the imaging range of objects within a scene onto the image sensor may be varied once the change of the focal length and the image distance occur. When the above mentioned compensation mechanism is applied, the image may be incorrectly reconstructed if the original reconstruction parameters of the matrix-array camera are used. The compensation method for image reconstruction in accordance with the present invention provides a solution to reconstruct the image using a set of image reconstruction parameters based on displacement or distance of the lens module.

According to an embodiment of present invention, the original reconstruction parameters may be modified when the focal length for the multi-camera imaging system is compensated. The major components of the multi-camera imaging system are such as multi-sensor module and multi-lens module in an image capturing module. The multi-lens module includes a plurality of arrayed lens. Correspondingly, the multi-sensor module includes a plurality of image sensors arranged in an array. The plurality of image sensors are one-by-one arranged corresponding to the positions of the plurality of lens.

The system includes a distance adjustment unit which is used to adjust the distance due to the temperature compensation made for compensating the change of focal length. The change in refractive index due to the temperature change may cause change of the focal length. The effect of thermal expansion upon the material of the lens may also change the focal length. The distance adjustment unit accordingly adjusts the distance between the multi-lens module and the multi-sensor module. The system includes a position-sensing module which is used to sense the displacement or change of distance between the multi-lens module and the multi-sensor module. Therefore, the system may generate a set of new image reconstruction parameters according to the displacement or the change of distance.

In the compensation method for the multi-camera imaging system, the displacement or the change of distance between the multi-lens module and the multi-sensor module is continuously measured. When any displacement or change of distance is found since the temperature compensation is made for the change of focal length, a set of image reconstruction parameters are generated for image reconstruction. According to one of the embodiments, a lookup table is prepared. The lookup table exemplarily records correspondence between the image reconstruction parameters and the displacement or change of distance between the multi-lens module and the multi-sensor module. Therefore, the system may acquire the suitable image reconstruction parameter related to the measured displacement or change of distance according to the lookup table.

DETAILED DESCRIPTION OF THE PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

A matrix-array camera is a camera device having a plurality of cameras. Every lens unit in one camera is disposed opposite to an image sensor such as CCD or CMOS. The plurality of lens units and their corresponding image sensor constitute the camera device. This kind of matrix-array camera is able to create a merged image by reconstructing the plurality of image signals using firmware or software process.

In the disclosure in accordance with the present invention, the multi-camera imaging system exemplarily has an image capturing module having a lens array. A multi-lens module is formed by assembling a plurality of lenses arranged in a specific array type. A multi-sensor module made of a plurality of image sensors is disposed corresponding to the multi-lens module.

Figure 1:
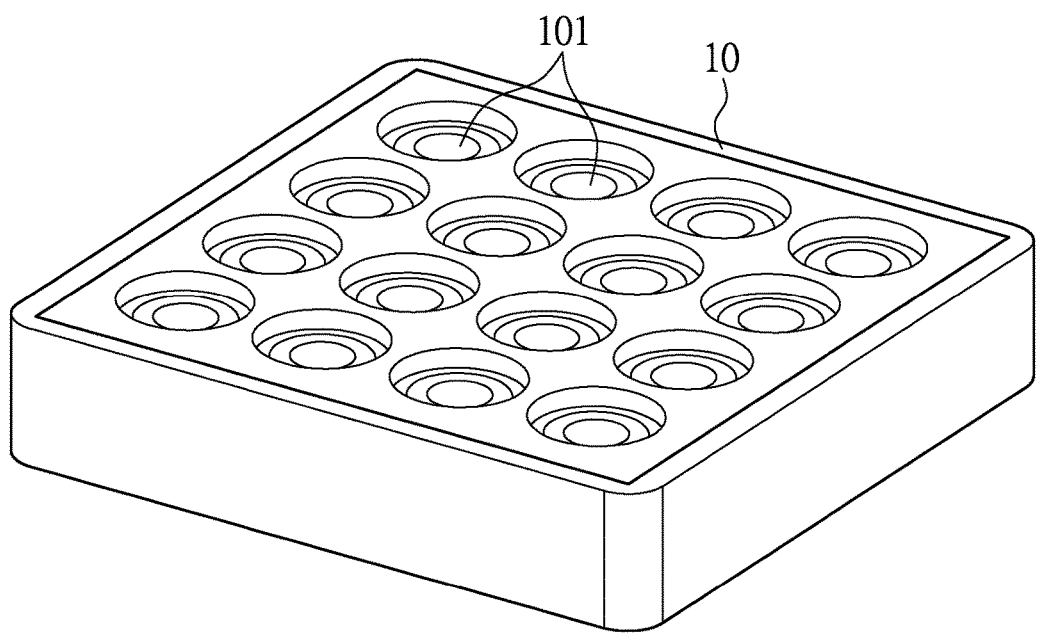
FIG. 1 is a schematic diagram showing a multi-lens module of a conventional matrix-array camera.

The multi-lens module of the multi-camera imaging system is schematically described in FIG. 1. A distance between the multi-lens module and the multi-sensor module defines an image distance, in which the image may be clearly imaged. According to the imaging formula showing reciprocal of focal length equals to addition of reciprocal of image distance and reciprocal of object distance, the change of focal length may primarily result in change of image distance since the object distance is a large value as compared to the image distance.

Figure 2C:
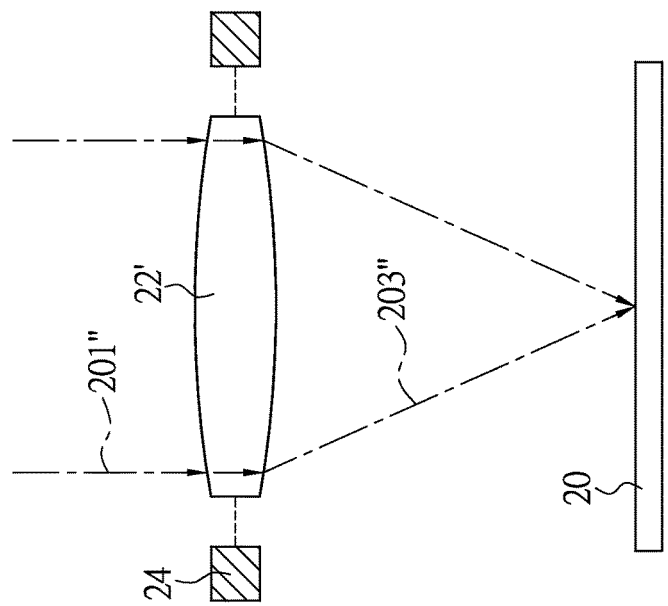
FIG. 2C schematically shows the multi-lens module of multi-camera imaging system in a condition after distance adjustment.
Figure 2B:
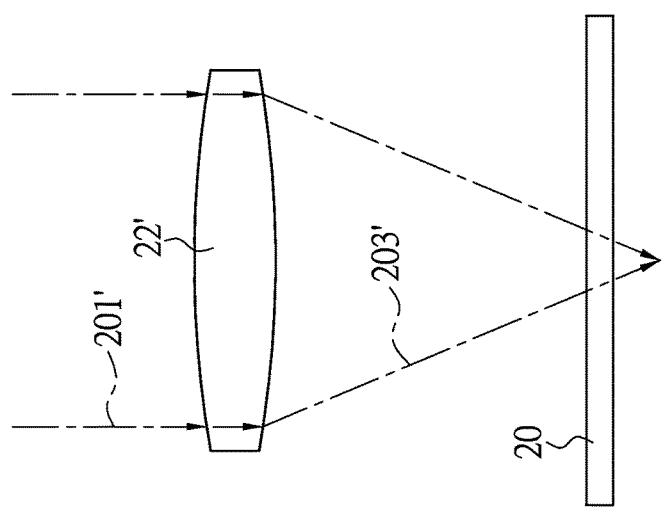
FIG. 2B schematically shows the multi-lens module of multi-camera imaging system in a condition of incorrect focusing.
Figure 2A:
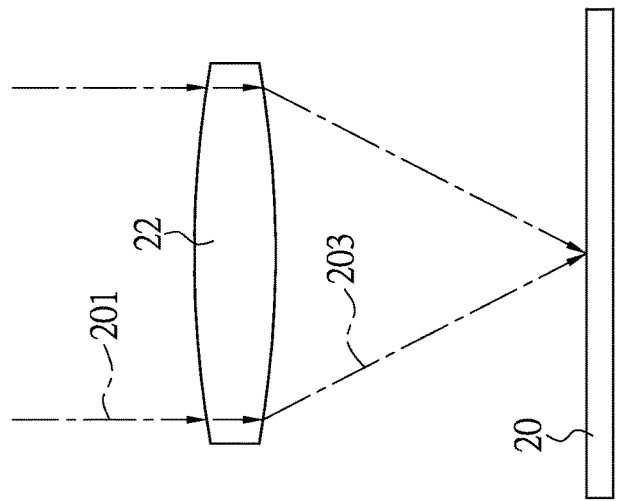
FIG. 2A schematically shows the multi-lens module of multi-camera imaging system in a condition of correct focusing.

Reference is made to FIG. 2A showing a condition with normal focusing of the multi-camera imaging system. A lens unit 22 is described as being representative of the multi-lens module. In the diagram, the lens unit 22 is corresponding to an image sensor 20 of the multi-sensor module. Specifically, an image distance between the lens unit 22 and the image sensor 20 exists. When an incident light 201 goes through the lens unit 22 and forms a refractive light 203, a final image can be correctly focused upon the image sensor 20 under a regular condition.

However, the focal length of the lens such as the shown lens unit 22' in the multi-lens module of the multi-camera imaging system may be affected on account of the change of temperature. For example, the effect of thermal expansion may alter the focal length of the system. Further, the refractive index of the lens unit may be changed due to the thermal effect. The change of focal length may result in the error focusing.

Reference is next made to FIG. 2B describing the single lens unit 22' within the multi-lens module. The incident light 201' goes through the lens unit 22' and refracted. The refractive light 203' may be varied because of the thermal effect. For example, the refractive index of the lens may decline when the temperature rises. Accordingly, the focusing is incorrect and becomes defocused from the image sensor 20 since the focal length is elongated.

FIG. 2C exemplarily shows the condition in adjusting the distance. In an exemplary example, the lens unit 22' is disposed with a distance adjustment unit 24. The distance adjustment unit 24 drives the multi-lens module to move to perform temperature compensation. The displacement causes change of image distance for the lens unit 22' to achieve correct focusing upon the image sensor 20. In the diagram, an incident light 201" enters the system and forms a refractive light 203". The distance adjustment unit 24 allows the light to be correctly focused on the image sensor 20.

For example, the temperature variation may result in incorrect focusing. The distance adjustment unit 24 may adopt a specific temperature compensation mechanism according to a conventional technology. The temperature compensation mechanism employs a kind of material characterized by its deformation caused by the temperature change. The temperature compensation allows the lights to be clearly imaged upon the multi-sensor module 20 correcting the distance between the multi-lens module with the lens unit 22' and the multi-sensor module 20. Related reference is made to FIG. 2C.

According to one of the embodiments in the disclosure, the multi-lens module produces a displacement when the distance is adjusted. This displacement appears as the image distance between the multi-lens module and the multi-sensor module is changed. Thus the imaging position or imaging range formed on the multi-sensor module is varied as the lights from the scene enter the multi-lens module. References are made to FIG. 4A and FIG. 4B. A calibration scheme for the image reconstruction in accordance with the present invention is applied to correcting the focal length, so as to change the image distance, namely the distance between the multi-lens module and the multi-sensor module.

A relative displacement made by the multi-lens module in the multi-camera imaging system may be firstly detected. After that, the system acknowledges the displacement of image distance or the information related to the displacement or the change of distance between the multi-lens module and the multi-sensor module.

Figure 3A:
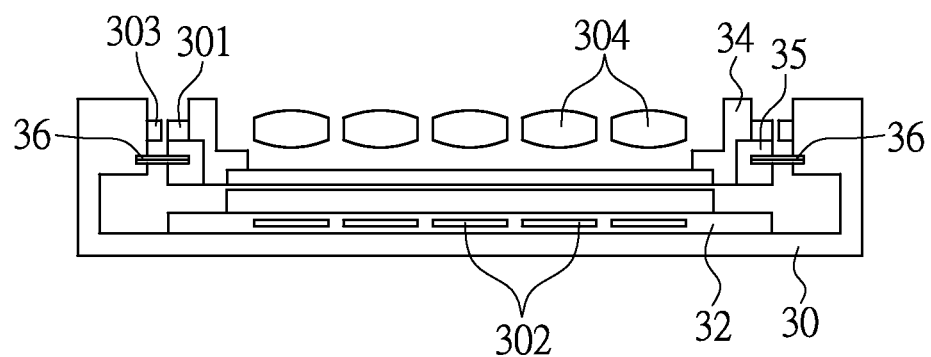
FIG. 3A shows a schematic diagram depicting the multi-camera imaging system adopting a temperature compensation mechanism in one condition of the present invention.
Figure 3B:
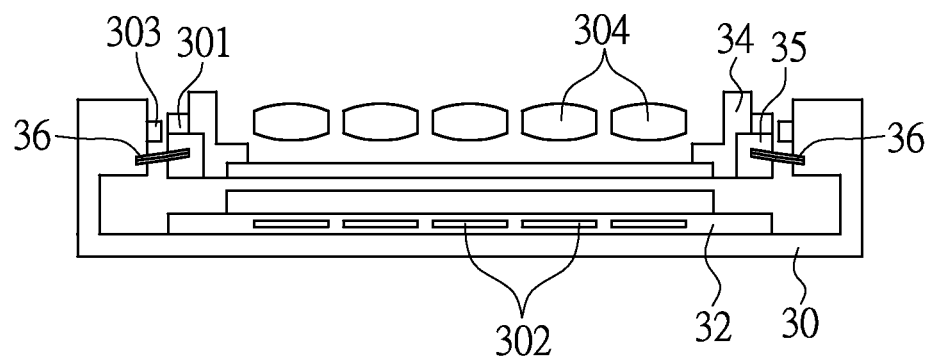
FIG. 3B shows a schematic diagram depicting the multi-camera imaging system adopting a temperature compensation mechanism in the next condition of the present invention.

FIG. 3A and FIG. 3B schematically show the embodiments of the multi-camera imaging system.

In FIG. 3A, a carrier mechanism 30 bears the portion of the image capturing module of the multi-camera imaging system. The carrier mechanism 30 is such as main frame structure for supporting the whole mechanism of the matrix-array camera. This carrier is such as an unmovable member where the image capturing module of the multi-camera imaging system is disposed. In the carrier, the image capturing module essentially includes a multi-lens module 34 having lenses 304 carried by a movable member 35, and a multi-sensor module 32 with image sensors 302. The multi-sensor module 32 of the image capturing module includes the plurality of image sensors 302 which are preferably arranged in an array. The carrier mechanism 30 schematically includes the movable member 35 which bears and drives the multi-lens module 34 to move. The multi-lens module 34 includes the plurality of lenses 304 arranged in an array. The plurality of image sensors 302 are positioned one-by-one to the positions of the lenses 304.

It is noted that the major change of the focal length is caused by the temperature change, e.g. the effect of thermal expansion; the change of temperature may also alter the refractive index of the lens. When the focal length of each lens of the multi-lens module 34 changes, the temperature compensation mechanism 36 drives the movable member 35 with the multi-lens module 34 to move and produce the displacement. The displacement is to change the distance between the multi-lens module 34 and the multi-sensor module 32. One of the objectives of the temperature compensation is to clearly focus the lights onto the multi-sensor module 32. This mechanism is such as the operation of the distance adjustment unit (24) shown in FIG. 2C.

The temperature compensation mechanism 36 can be implemented by a stacked structure of materials. Each material within the structure has its specific coefficient of expansion. The stacked structure may produce a curvature in accordance with the change of temperature. This effect is a mechanism of compensation.

The initial state of the temperature compensation mechanism 36 is exemplarily shown in FIG. 3A. One end of the stacked structure couples to the unmovable member of the carrier mechanism 30; one other end is to the movable member 35. An initial distance is existed between the multi-lens module 34 and the multi-sensor module 32. The temperature compensation renders the physical change of curvature of the temperature compensation mechanism 36. The compensation process drives the movable member 35 with the multi-lens module 34 to move and to have a new distance to the multi-sensor module 32, as shown in FIG. 3B.

When the distance is adjusted, the image may be correctly imaged onto the image sensor. However, the correct imaging under the compensation mechanism also causes some further changes of the imaging position or imaging range of the captured object on the image sensor. Therefore, the image reconstruction parameters for the multi-camera imaging system need to be adjusted.

The system of the aspect is firstly acquiring the displacement between the multi-lens module 34 and the multi-sensor module 32. A position-sensing module (301, 303) is introduced to the multi-camera imaging system according to the embodiment of the invention. The position-sensing module (301, 303) is used to sense the change of distance between the multi-lens module 34 and the multi-sensor module 32, especially the change due to the temperature compensation. Any displacement or change of distance requires new image reconstruction parameters.

As shown in FIG. 3A and FIG. 3B, the position-sensing module in one embodiment may be disposed at the unmovable member of the multi-camera imaging system. The mentioned carrier mechanism 30 for the image capturing module is such as the unmovable member. According to one of the embodiments, the position-sensing module may be a kind of Hall Effect sensor 303 accompanied with a magnetic element 301. The magnetic element 301, paired with the Hall Effect sensor 303, may be disposed at the construction of the multi-lens module 34 which is driven by the temperature compensation mechanism 36. The magnetic element 301 is as an indicator for indicating the displacement of the structure. In an exemplary embodiment, the Hall Effect sensor 303 is disposed at the unmovable member of the carrier mechanism 30. The magnetic element 301 can be disposed at the movable member 35 thereof. The Hall Effect sensor 303 is able to detect the movement of the magnetic element 301 when the compensation mechanism 36 is applied to the structure. Namely any magnetic field variation is used to measure the displacement.

In one further example, the position-sensing module is implemented by a strain gauge sensor. The strain gauge sensor may be directly disposed on the temperature compensation mechanism for measuring strains of the temperature compensation mechanism. The value of strain is used to determine a displacement.

Figure 4A:
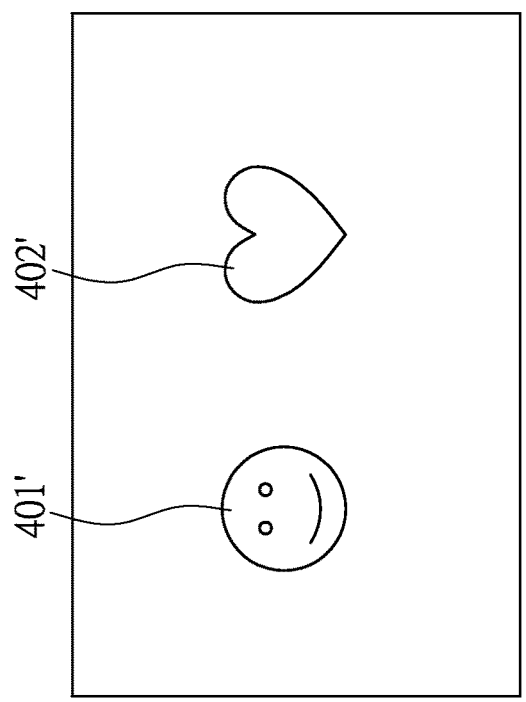
FIGS. 4A and 4B show schematic diagrams describing a change of focal length leading to a change in imaging.
Figure 4B:
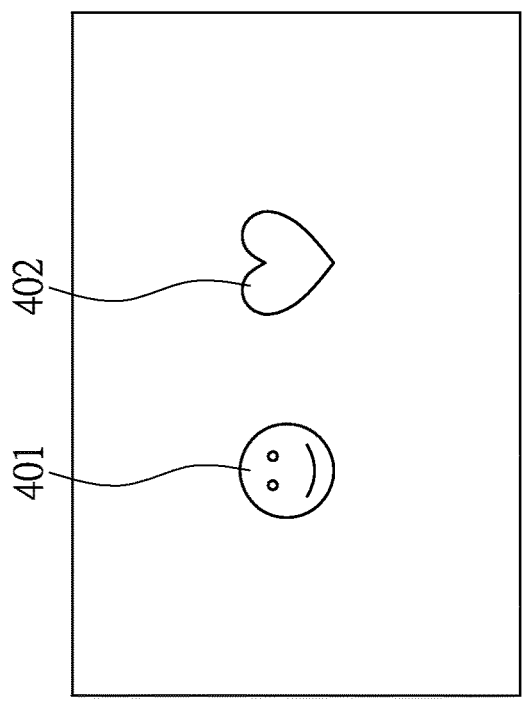

FIG. 4A and FIG. 4B schematically show the conditions of imaging change due to displacement made by the temperature compensation mechanism.

In FIG. 4A, there are two objects in one scene. When the multi-camera imaging system takes a picture of the scene, the objects are imaged onto the image sensor of the system. The objects projected onto the image sensor are such as face sign 401 and love sign 402. In FIG. 4B, it appears that the focal length becomes longer as the temperature rises. When the compensation is applied to the focal length, the distance between the multi-lens module and the multi-sensor module is changed. This compensation mechanism allows the images of objects to be clearly imaged onto the image sensor. However, the changes of distance and the focal length render the changes of imaging positions and/or imaging ranges onto the image sensor, as shown the face sign 401' and love sign 402'. FIG. 4A and FIG. 4B schematically display the changes of imaging positions and ranges.

Figure 5:
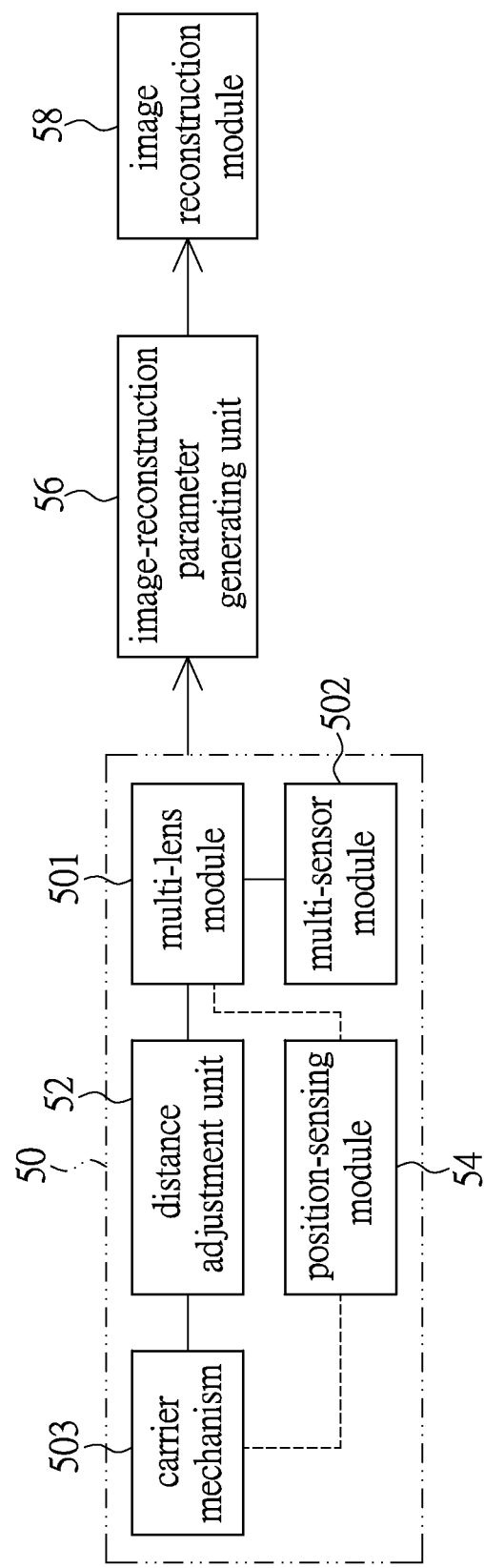
FIG. 5 shows a functional block diagram describing the multi-camera imaging system in one embodiment of the present invention.

Reference is made to FIG. 5 showing the functional diagram describing the multi-camera imaging system in one embodiment of the present invention.

The major component of the multi-camera imaging system is such as an image capturing module 50. The image capturing module 50 includes a carrier mechanism 503. A multi-lens module 501 and a multi-sensor module 502 are also included. The lenses and image sensors are disposed at opposite positions. The lights of objects form the images on the image sensors through the lenses. In one embodiment, the multi-lens module 501 is disposed at the movable member of the carrier mechanism 503; the multi-sensor module 502 is disposed at the unmovable member of carrier mechanism 503.

The image capturing module 50 is disposed with a distance adjustment unit 52, which is used to compensate the failure of focusing. The distance adjustment unit 52 is coupled to the multi-lens module 501. The distance adjustment unit 52 drives the multi-lens module 501 to move by the compensation. A position-sensing module 54 is used to acquire any change of the multi-lens module 501. The system may acknowledge the displacement or change of distance between the multi-lens module 501 and multi-sensor module 502 mounted on the carrier mechanism 503 through this position-sensing module 54. The position-sensing module 54 is exemplarily shown in the above-described FIG. 3A and FIG. 3B.

Next, based on the information of displacement or the distance, the multi-camera imaging system is able to provide image reconstruction parameters for image reconstruction. An image-reconstruction parameter generating unit 56 generates a set of image reconstruction parameters according to the displacement or change of distance between the modules 501 and 502. The system submits the image reconstruction parameters to the image reconstruction module 58 for performing image reconstruction. It is noted that the set of image reconstruction parameters corresponding to the displacement or change of distance is able to solve reconstruction error due to the temperature compensation applied to the change of the focal length.

One of the solutions to check a set of image reconstruction parameters corresponding to the displacement or change of distance is to provide a lookup table. The records in the lookup table may be based on the experimental data. The lookup table records the relationship between the image reconstruction parameters and the related displacement or the change of distance between the multi-lens module 501 and the multi-sensor module 502 of the system. From the lookup table, the system may instantly acquire the image reconstruction parameters based on the information of displacement or change of distance generated by the mentioned position-sensing module 54. It is noted that the correspondence between the image reconstruction parameters and the displacement or change of distance between the multi-lens module and the multi-sensor module is introduced to the system for instant image reconstruction as the system operates.

Figure 6:
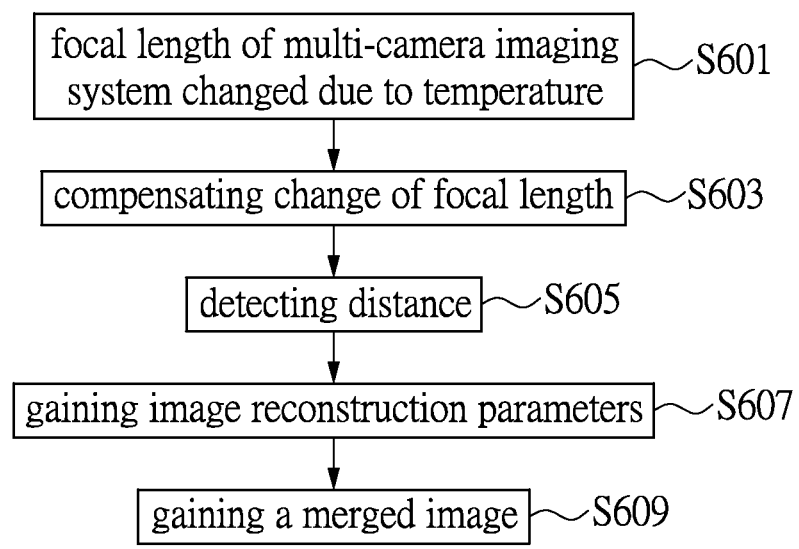
FIG. 6 shows a flow chart describing the method for image reconstruction compensation for the multi-camera imaging system.

Reference is next made to FIG. 6 showing a flow chart illustrating the compensation method for image reconstruction for the multi-camera imaging system.

In the multi-camera imaging system, such as step S601 in the method, the effect of temperature change results in altering focal length. The temperature compensation mechanism is introduced to compensate for the change of focal length of system. Next, in step S603, the compensation mechanism also causes the change of distance between the multi-lens module and the multi-sensor module of the multi-camera imaging system. Accordingly, the imaging position and imaging range of the objects onto the image sensor are changed. The original image reconstruction parameters for the multi-camera imaging system are required to be adjusted. In step S605, the system measures the displacement or change of distance between the multi-lens module and multi-sensor module. The displacement or change of distance is used as the basis to find out the new image reconstruction parameters. A lookup table may be created to record the relationship between the various displacements or changes of distance and the image reconstruction parameters. In step S607, from the lookup table, the system can acquire the suitable image reconstruction parameters for the image reconstruction.

The system then performs image reconstruction based on the new image reconstruction parameters. Such as in step S609, the multi-camera imaging system obtains a corrected image.

Thus, when the conventional technology employs temperature compensation to fix the focal length due to the property of lens being changed with change of temperature, it neglects the change of distance between the multi-lens module and the multi-sensor module which may cause failure of image reconstruction by the original image reconstruction. Therefore, the compensation method for image reconstruction for the multi-camera imaging system in accordance with the present invention is provided. The new set of image reconstruction parameters made based on the displacement or change of distance between the modules is generated to more precisely reconstruct the image.

It is intended that the specification and depicted embodiment be considered exemplary only, with a true scope of the invention being determined by the broad meaning of the following claims.

What is claimed is:
1. A multi-camera imaging system, comprising:
a multi-lens module, comprising a multiple-lens arrangement;
a multi-sensor module, comprising a multiple-sensor arrangement, wherein positions of the multiple image sensors one-by-one correspond to positions of the multiple lens;
a distance adjustment unit, being a temperature compensation mechanism configured to compensate the change of focal length due to temperature, used to adjust a distance between the multi-lens module and the multi-sensor module;

a position-sensing module, used to sense a displacement or a change of distance between the multi-lens module and the multi-sensor module; and an image-reconstruction parameter generating unit used to generate image reconstruction parameters for image reconstruction according to the displacement or the change of distance between the multi-lens module and the multi-sensor module.

2. The system according to claim 1, wherein the multi-lens module is disposed on a movable member of a carrier mechanism; the multi-sensor module is disposed on an unmovable member of the carrier mechanism; the position-sensing module includes a Hall effect sensor disposed on the unmovable member of the carrier mechanism, and a magnetic element disposed on the movable member of the carrier mechanism; the temperature compensation mechanism enables the displacement or the change of distance between the multi-lens module and the multi-sensor module.

3. The system according to claim 1, wherein the position-sensing module is a strain gauge sensor disposed onto the temperature compensation mechanism, used to measure strain of the temperature compensation mechanism.

4. A compensation method for image reconstruction for a multi-camera imaging system according to claim 1, comprising:

gaining the displacement and the change of distance between the multi-lens module and the multi-sensor module of the multi-camera imaging system; and gaining a set of image reconstruction parameters for image reconstruction if the displacement or the change of distance is found.

5. The method according to claim 4, wherein the displacement or the change of distance between the multi-lens module and the multi-sensor module is obtained by measuring strain by a strain gauge sensor disposed onto the temperature compensation mechanism.

6. The method according to claim 5, comprising a lookup table introduced to recording correspondence between the image reconstruction parameters and the displacement or change of distance between the multi-lens module and the multi-sensor module.

7. The method according to claim 4, wherein the displacement or change of distance between the multi-lens module and the multi-sensor module is obtained by a Hall Effect sensor and a magnetic element disposed on the multi-camera imaging system.

8. The method according to claim 7, wherein, providing a lookup table to record correspondence between the image reconstruction parameters and the displacement or change of distance between the multi-lens module and the multi-sensor module.

9. The system according to claim 1, further comprising an image reconstruction module for performing image reconstruction with the image reconstruction parameters.

* * * * *